United States Patent [19]

Jennings

[11] Patent Number: 5,781,186

[45] Date of Patent: Jul. 14, 1998

[54] ARRANGEMENT FOR SPECIFYING PRESENTATION OF MULTIMEDIA MESSAGE COMPONENTS

[75] Inventor: Terry Don Jennings, Westminster, Colo.

[73] Assignee: Lucent Technologies Inc., Murray Hill, N.J.

[21] Appl. No.: 590,031

[22] Filed: Feb. 2, 1996

[51] Int. Cl.$^6$ .................................................. G06T 1/00
[52] U.S. Cl. ............................... 345/302; 395/200.36
[58] Field of Search ........................... 395/302, 807, 395/777, 792, 200.49, 200.61, 200.36; 345/302; 707/515, 530; 379/100.08; 358/402

[56] References Cited

U.S. PATENT DOCUMENTS

| | | | |
|---|---|---|---|
| 5,388,264 | 2/1995 | Tobias, II et al. | 395/614 |
| 5,420,801 | 5/1995 | Dockter et al. | 364/514 R |
| 5,517,652 | 5/1996 | Miyamoto et al. | 395/200.49 |
| 5,528,739 | 6/1996 | Lucas et al. | 395/788 |

FOREIGN PATENT DOCUMENTS

| | | | |
|---|---|---|---|
| 6030244 | 2/1985 | Japan . | |
| 04356844 | 12/1992 | Japan | H04L 12/54 |
| 9525312 | 9/1995 | WIPO | G06F 15/62 |

OTHER PUBLICATIONS

Diamond: A Multimedia Message System Built on a Distributed Architecture, Thomas et al., Dec. 1985.

"An Experimental Multimedia Mail System", ACM Transactions on Office Information Systems, vol. 6, No. 1, Jan. 1988, pp. 63–81.

"Enhancing documents wit embedded programs: How Ness extends insets in the Andrew Toolkit", Wifred J. Hansen, Computer Languages, 1990 International Conference, pp. 23–32.

"Scripting Language Emerge in Standards Bodies", Rodriquez et al., IEEE Multimedia, vol. 2, Iss. 4, pp. 88–92, 1995.

"Computational Mail as network infrastructure for computer-supported cooperative work", ACM CSCW 92; 1992, Nathaniel S. Borenstein, pp. 67–74.

Conception of a Multimedia Electronic Mail Based on Standards, Gay et al., IEEE 1993, pp. 16–22.

T. Yoneda et al., *A New Communication Tool: Time Dependent Multimedia*, Proceedings of the International Conference on Distributed Computing Systems, Yokohama, Jun. 9–12, 1992, No. Conf. 12, (IEEE), pp. 90–97.

W. Edwards, *The Design and Implementation of the Montage Multimedia Mail System*, Communications for Distributed Applications and Systems, Chapel Hill, Apr., 18–19, 1991, No. Conf. 4, Apr. 18, 1991, IEEE, pp. 47–57.

*Primary Examiner*—Joseph H. Feild
*Attorney, Agent, or Firm*—David Volejnicek

[57] ABSTRACT

A new type of message component (204, 205) enables message creators to specify, inside of a message (200), how the body components (202–203) of the message are to be presented to message recipients; multiple such components enable multiple presentations to be specified for a single message. Included in the message by the message creator as one or more message components (204, 205) of type "presentation", each presentation component specifies the order, durations, and any concurrency, of presentation of the message's body components. Each presentation component is a script that, upon its invocation (300) by the message recipient, executes (302–318) on the recipient's message-presentation equipment (102, 107) and presents the message's body components to the message recipient in the order and for the durations specified, and presents concurrently any body components typically ones expressed in different media that are specified to be presented concurrently.

17 Claims, 4 Drawing Sheets

ARRANGEMENT FOR SPECIFYING PRESENTATION OF MULTIMEDIA MESSAGE COMPONENTS

TECHNICAL FIELD

This invention relates to electronic messaging systems, and specifically to multimedia messaging systems.

BACKGROUND OF THE INVENTION

Multi-media messaging systems permit a message to comprise one or more message components each expressed in any one of a plurality of different media. Commonly-used media for multimedia messaging include audio, fax, text, image (graphics), and video.

Quite often, the different message components have a specific relationship with one another, and this relationship needs to be preserved during message playback. Consider the example of a message that comprises an annotated slide presentation. There is a set of images which represent the slides, and a set of voice annotations each corresponding to each different slide. When the message is played out to the message recipient, it is desirable if not imperative that the slides be presented to the message recipient in the correct order and at a desirable rate, and that the presentation of each slide be accompanied by a simultaneous presentation of its corresponding voice annotation. There is therefore a need for an arrangement that effects the specifying and enforcing the order and relationship of the slides and voice annotations.

Moreover, the message sender may wish to provide some recipients of the message with a full presentation, but may want to provide other recipients with only an abridged presentation, without having to create two entirely different messages. Alternatively, the sender may wish to provide to the message recipient or recipients a choice between the full presentation and the abridged presentation without having to provide them with two different messages.

Unfortunately, known multi-media message authoring systems provide message creators with limited capabilities for specifying relationships between message components and enforcing these relationships during message playback. Illustrative examples of such systems are disclosed in U.S. Pat. Nos. 5,420,801 and 5,388,264, and in Japanese Kokai Patent Application No. SHO 60[1985]-30244. Generally, the known systems allow the message sender to specify only one presentation arrangement (e.g., component ordering and timing) for a message. They generally also enforce this single presentation arrangement during message playback, and do not allow the recipient to choose between different presentation arrangements.

SUMMARY OF THE INVENTION

This invention is directed to solving and meeting these and other disadvantages and needs of the prior art. Generally according to the invention, there is provided a new type of message component that enables message creators to specify, inside of a message, how (e.g., when, how fast, and in what order) the other components of a message are to be presented to message recipients, and that further enables multiple such presentations to be specified for a single message. Specifically according to the invention, a messaging method and apparatus receive and store, respectively, a message comprising a header component that describes the message, a plurality of body components each carrying a portion of message information carried by the message, and at least one presentation component that is separate from the header component and the body components and that defines an order and any concurrency of presentation of the body components to a message recipient. In response to invocation (e.g., a request to execute) of an individual presentation component, the method and apparatus present the body components to the message recipient in the order and with any said concurrency defined by the individual presentation component. Preferably, the message is a multimedia message that comprises a plurality of body components at least some of which are expressed in different media, and the individual presentation component defines an order of presentation of the body components, including a concurrency of presentation of the body components expressed in different media. In response to the invocation of the individual presentation component, the method and apparatus then present the body components in the order defined by the individual presentation component, including concurrently presenting the body components expressed in the different media. Further preferably, the individual presentation component further defines durations of presentation of the body components, and the method and apparatus also present the body components for the durations defined by the presentation component.

The invention advantageously enables a message creator to specify the order, concurrency, and preferably also duration of presentation of messages. The invention is particularly effective for specifying the concurrency of presentation of message components of multimedia messages that are expressed in different media. The invention advantageously allows the presentation, or even multiple presentations, to be specified in the message itself, without requiring any change in conventional message-creation, transmission, or reception systems, by including the presentation specification or specifications in the message itself as just another message component or components. The message recipient's message-presentation equipment then merely interprets or executes the presentation component in order to present the message to the message recipient in the manner desired by the message creator.

These and other advantages and features of the invention will become apparent from the following description of an illustrative embodiment of the invention taken together with the drawing.

DETAILED DESCRIPTION

Figure 1:
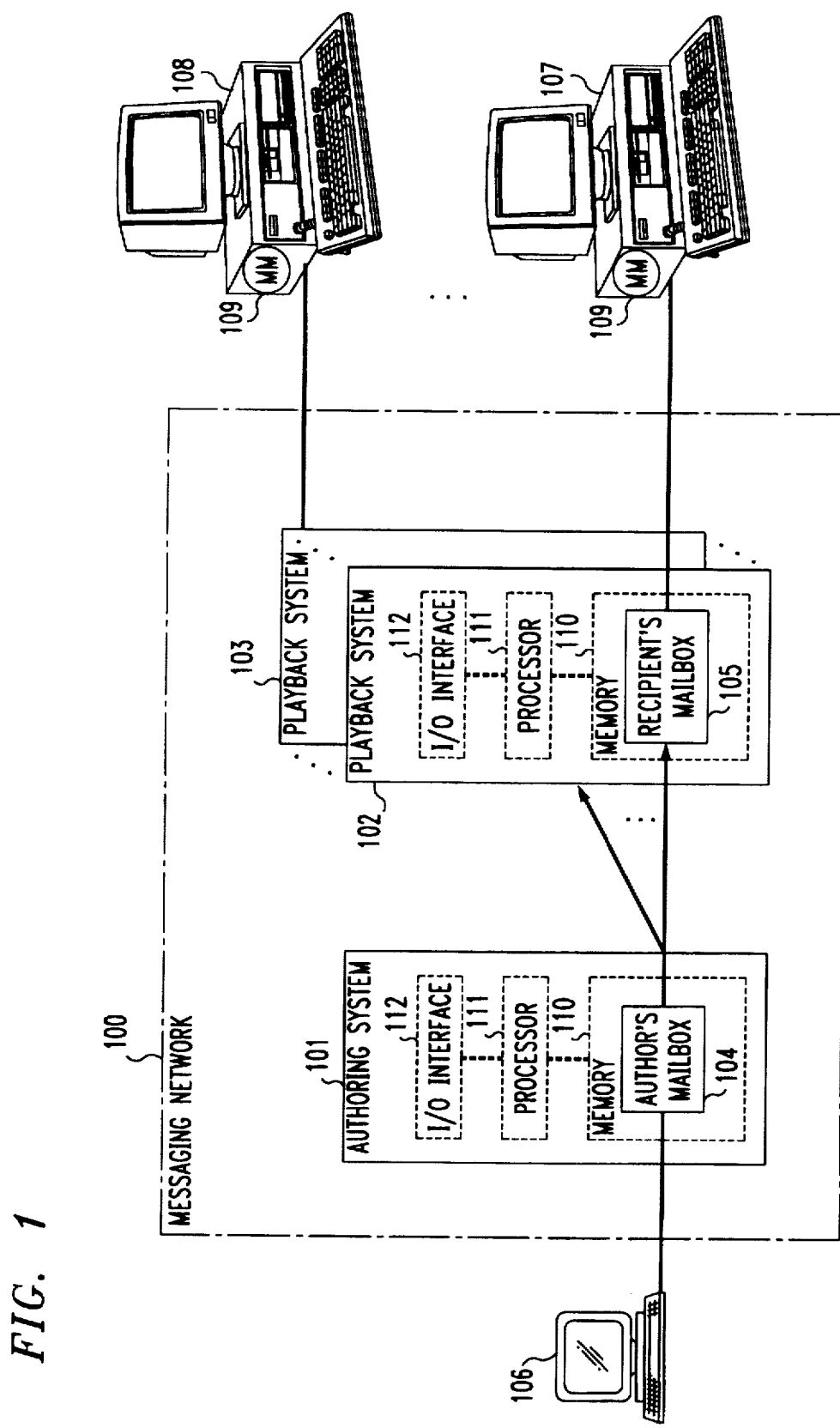
FIG. 1 is a block diagram of a messaging network that includes an illustrative implementation of the invention.

FIG. 1 shows a generalized multimedia messaging network 100. It illustratively comprises a plurality of interconnected multimedia messaging systems 101–103, each of which may be the AT&T Intuity® AUDIX® system, for example. Messaging systems 101–103 are connected to multimedia workstations 106–108 of messaging-service subscribers. Each workstation 106–108 is a general-purpose computer operating under control of programs stored in its memory and executed by its processor. Each messaging system 101–103 defines mailboxes of those subscribers whom it serves. As shown in FIG. 1, workstation 106, of a human user who is assumed to be a message originator in this illustrative example, is connected to messaging system 101. Messaging system 101 is identified as the authoring system, and defines a mailbox 104 for the user of workstation 106, designated as the author's mailbox. Also, workstation 107, of a human user who is assumed to be a message recipient in this illustrative example, is connected to messaging system 102. Messaging system 102 is identified as a playback system, and defines a mailbox 105 for the user of workstation 107, designated as the recipient's mailbox. Alternatively, workstations 106 and 107 may be served by the same messaging system, in which case the authoring system and the playback system will be the same system. Each recipient's workstation 107–108 preferably includes and executes a copy of a message management (MM) 109 program, such as the AT&T Intuity Message Manager. Each messaging system 101–103 is configured conventionally: it is a stored-program-controlled machine that comprises a memory 110 for storing data (including subscriber's mailboxes) and control programs, a processor 111 for executing the control programs out of memory 110 to control the operation of the messaging system and provide messaging services, and an input and output (I/O) interface 112, typically comprising a plurality of telephone line and trunk circuits and/or local area network (LAN) or wide area network (WAN) interfaces, by means of which processor 111 communicates with the messaging network 100 that lies outside of its messaging system 101–103.

Communications between subscribers in messaging network 100 are effected in the following manner: A message author creates a message in his or her own mailbox 104 via his or her workstation 106, and then sends the message to an address or addresses of one or more message recipients. Network 100 delivers and stores the message in the mailbox 105 or mailboxes of the one or more recipients. The recipients then effect playback of the message from their mailboxes via their workstations 107–108. As described so far, messaging network 100 is conventional.

Conventionally, a multi-media message 200 (see FIG. 2) comprises a plurality of message components 201–203. The first message component is a message header 201, which carries information that describes the message, including information that defines a message presentation, followed by one or more message-body components, each expressed in one of a plurality of different media, that carry the message's information contents. The medium in which a message-body component 202–203 is expressed constitutes the component's type. Each component 202–203 may further comprise one or more records 206. A record is, for example, one page of a text or a fax component, or one image of an image component, or a scene (a plurality of frames) of a video component, etc.

Figure 2:
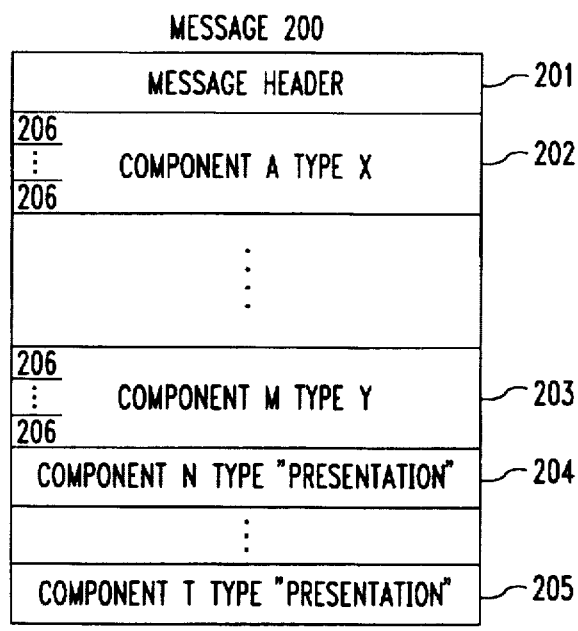
FIG. 2 is a block diagram of a message of the messaging network of FIG. 1 that embodies an illustrative implementation of the invention.

According to the invention, the conventional message configuration is modified such that message header 201 no longer carries the message presentation information. Instead, there is defined a new message component type, designated as "presentation", for carrying the message presentation information. In respects other than its type, a "presentation" message component is treaded by messaging network 100 as any other message-body component. A message may include one or more "presentation" components, each defining a different presentation of the message. This message configuration is shown in FIG. 2.

Each "presentation" component 204–205 is a script that defines the sequence and duration of presentation of message-body components or components' records to the message recipient. Illustratively, the language for composing the scripts is very simple, and comprises the three commands listed in Table A.

TABLE A

| command | arguments | description |
| --- | --- | --- |
| play | component_ID | plays the whole indicated component, or the indicated number of records of the indicated component; all play commands in a sequence that is not interrupted by a "wait" command are executed simultaneously |
| | component_ID#_records | |
| wait | time | stop playback after the indicated time has elapsed |
| | component_ID | stop playback when the indicated component, or the indicated number of records of the indicated component, has finished playing |
| | component_ID#_records | |
| skip | time | skip the indicated amount of time into the subsequently-identified component |
| | #_records | skip the indicated number of records (e.g., pages, images, etc.) into the subsequently-identified component |
| skip (alternative implementation) | + time<br>− time | skip the indicated amount of time forward (+) or backward (−) from the present position in the subsequently-identified component |
| | + #_records<br>− #_records | skip the indicated number of records forward (+) or backward (−) from the present position in the subsequently-identified component |

The message originator composes a presentation script and includes it in message 200 as a "presentation" component 204–205 in the same manner and using the same tools (e.g., an editor) as he or she would use to compose any other message-body text component.

Using again for illustrative purposes the voice-annotated slide presentation message, assume that each voice annotation is a separate message-body "audio" component, while each slide image is a separate record of a single message-body "image" component. Assume further that all slides are not necessarily annotated. A presentation component 204 for presenting this entire message may comprise the following script:

| script | comments |
| --- | --- |
| play image 1_record | display first slide while playing first annotation |
| play audio_1 | |
| wait audio_1 | |
| skip 1_records | display second slide for |
| play image 1_record | 15 seconds and simultaneously |
| play audio_2 | play second annotation |
| wait 15_seconds | |
| skip 2_records | display third slide |

-continued

| script | comments |
| --- | --- |
| play image 1__record | for 15 seconds |
| wait 15__seconds | |
| skip 3__records | display fourth slide |
| play image 1__record | while playing third annotation |
| play audio__3 | |
| wait audio__3 | |
| • | |
| • | |
| • | |

Furthermore, another presentation component 205 for presenting an bridged version of the voice-annotated slide presentation message may comprise the following script:

| script | comments |
| --- | --- |
| skip 2__records | skip the first two slides |
| play image 1__record | and display the third slide |
| wait 15__seconds | for 15 seconds |
| skip 5__records | skip the next three slides |
| play image 1__record | and display the sixth slide |
| play audio__5 | while playing the fifth annotation |
| wait audio__5 | |
| skip 3__records | skip back two slides |
| play image 1__record | and display the fourth slide |
| play audio__3 | while playing the third annotation |
| wait audio__3 | |
| skip 13__records | skip the next 10 slides |
| play image record__14 | and display the fourteenth slide |
| play audio__11 | slide for 15 seconds and |
| wait 15__seconds | simultaneously play the eleventh annotation |

Figure 3:
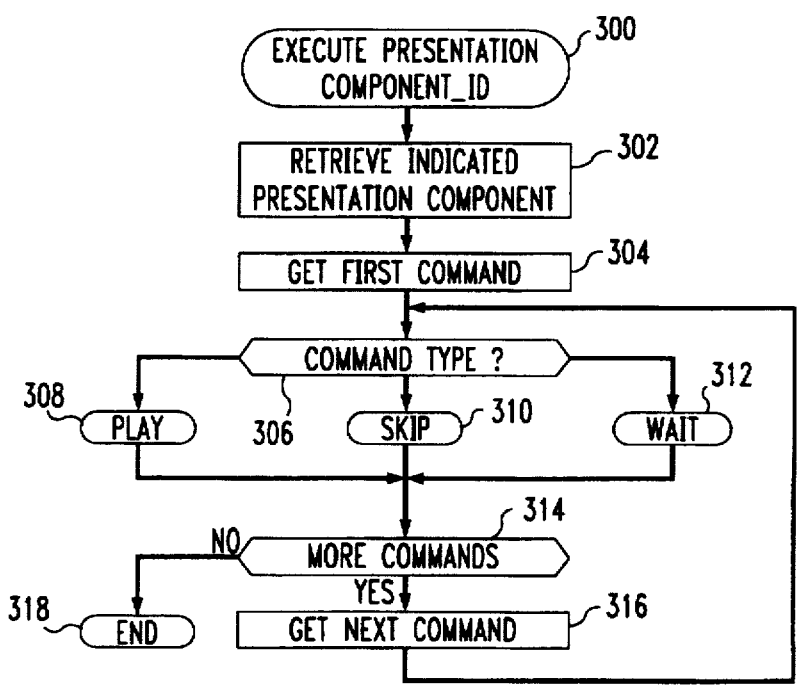
FIG. 3 is a functional flow diagram of execution of a presentation script in response to an "execute presentation" command in the network of FIG. 1.

When the message recipient accesses a received message 200 in his or her mailbox 105, he or she can view the presentation message component 204 or components 204-205 in the same manner and using the same tools (e.g., workstation display screen) as he or she would use to view any other message-body text segment. If and when the message recipient elects to have message 200 presented to him or her, the message recipient gives an "execute presentation" command either to message management 109 of his or her workstation 107 or if workstation 107 is not equipped with message management 109 to his or her playback system 102, followed by an identifier of one of the presentation components 204-205 of message 200, at step 300 of FIG. 3. (If message 200 contains only one presentation component 204, the "execute presentation" command need not be accompanied by a presentation component identifier.) In response, workstation 107 or processor 111 retrieves the indicated presentation component 204 from message 200 in recipient's mailbox 105, at step 302, gets the first command of the presentation script from the retrieved presentation component 204, at step 304, and determines the command type, at step 306. If the command type is "play", workstation 107 or processor 111 proceeds to step 308 to execute the command in the manner shown in FIG. 5; if the command type is "skip", workstation 107 or processor 111 proceeds to step 310 to execute the command in the manner shown in FIG. 4; and if the command type is "wait", workstation 107 or processor 111 proceeds to step 312 to execute the command in the manner shown in FIG. 6. Following steps 308, 310, or 312, workstation 107 or processor 111 checks if the presentation script contains more commands, at step 312. If not, execution of the script ends, at step 316; if so, workstation 107 or processor 111 gets the next command of the presentation script, at step 314, and returns to steps 306 et seq.

Figure 4:
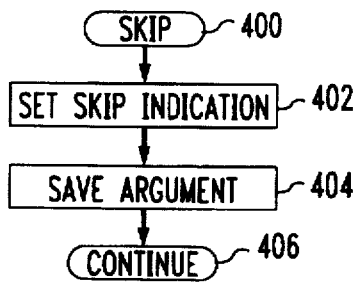
FIG. 4 is a functional flow diagram of execution of a "skip" command in the network of FIG. 1.

The execution of a "skip" command is shown in FIG. 4. Upon encountering the "skip" command, at step 400, workstation 107 or processor 111 sets a skip indication, such as a memory flag or a register flag, at step 402, saves the argument of the "skip" command, at step 404, and then proceeds to process the next script command, at step 406.

Figure 5:
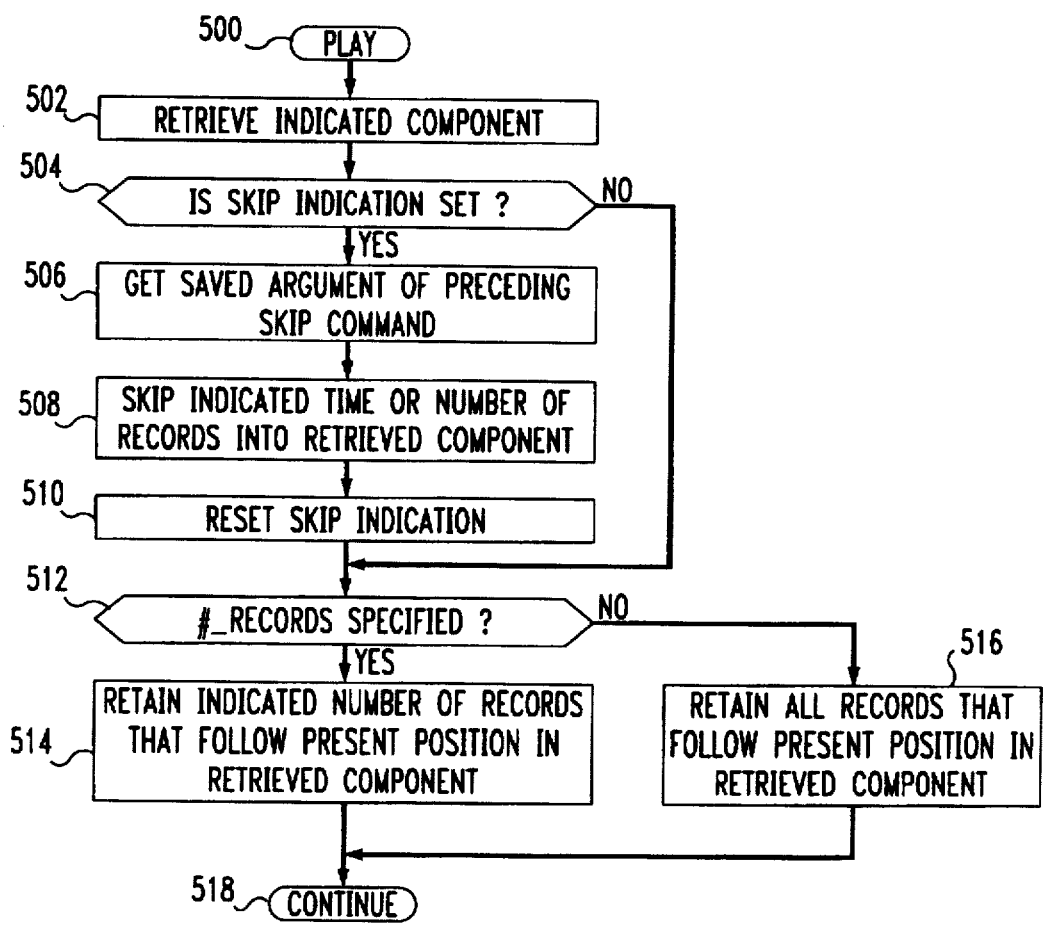
FIG. 5 is a functional flow diagram of execution of a "play" command in the network of FIG. 1.

The execution of a "play" command is shown in FIG. 5. Upon encountering the "play" command, at step 500, workstation 107 or processor 111 retrieves the component that is indicated by the argument of the play command, from message 200 in recipient's mailbox 105, at step 502. Workstation 107 or processor 111 then checks whether the skip indication (see step 402 of FIG. 4) is set, at step 504. If the skip indication is set, workstation 107 or processor 111 gets the saved argument of the preceding skip command (see step 404 of FIG. 4), at step 506, and skips the amount of time or the number of records indicated by that argument into the message component that it retrieved at step 502, at step 508. This step may involve merely setting a "playback start" pointer to point the indicated amount of time or number of records into the message-body component from the beginning of the message-body component. Workstation 107 or processor 111 then resets clears the skip indication, at step 510.

Following step 510, or if it has been determined at step 504 that the skip indication is not set, workstation 107 or processor 111 checks whether the argument of the "play" command specifies a number of records, at step 512. If so, workstation 107 or processor 111 retains for presentation only that indicated number of the message-body component's records that follow the present position (i.e., the beginning of message, or see step 508) in the message-body component, at step 514. This step may involve merely setting a "playback stop" pointer to point the indicated number of records beyond the "playback start" pointer into the message-body component. If the argument of the "play" command does not specify a number of records, workstation 107 or processor 111 retains for presentation all records that follow the present position in the message, at step 516. This step may involve merely setting the "playback stop" pointer to point at the end of the message component. Following step 514 or 516, workstation 107 or processor 111 proceeds to process the next script command, at step 518.

Figure 6:
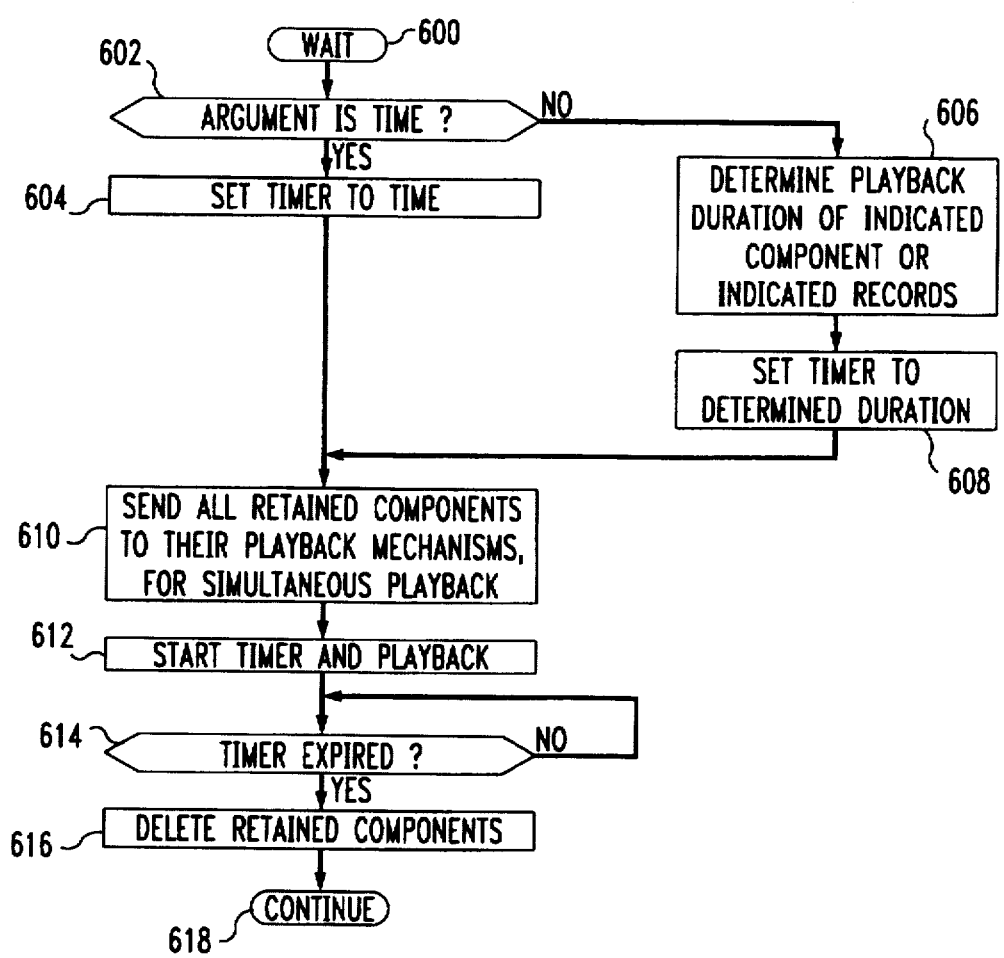
FIG. 6 is a functional flow diagram of execution of a "wait" command in the network of FIG. 1.

The execution of a "wait" command is shown in FIG. 6. Upon encountering the "wait" command, at step 600, workstation 107 or processor 111 checks whether the command's argument specifies a time period, at step 602. If so, workstation 107 or processor 111 sets a timer to the specified time period, at step 604. If the argument does not specify a time period, but rather specifies a message-body component or a number of records of a message-body component, workstation 107 or processor 111 determines the playback duration of the specified component or records, at step 606. Illustratively, the duration is included among descriptive information that accompanies each component or record; alternatively, the duration is determined from the size of the file that constitutes the component or record. Workstation 107 or processor 111 then sets the timer to the determined duration, at step 608.

Following step 604 or 608, workstation 107 or processor 111 sends all previously-retained components (see steps 514 and 516 of FIG. 5) to their playback mechanisms for simultaneous playback, at step 610. Illustratively, processor 111 sends the retained components to workstation 107, while workstation 107 distributes the retained components to its display buffer, to a fax buffer, to a printer buffer, to a sound-card buffer, etc., depending upon the type (i.e., medium) of each retained component. Workstation 107 or processor 111 then causes playback of the components to commence and starts the timer that it had set at step 604 or 608, at step 612. Workstation 107 or processor 111 monitors the timer, at step 614. When the timer expires, workstation 107 or processor 111 deletes the retained components that it had played at step 612, at step 616. This step may involve merely erasing the "playback start" and "playback stop" pointers into the message component. Following step 616, workstation 107 or processor 111 proceeds to process the next script command, at step 618.

To get a different presentation of the message, the message recipient merely selects and executes one of the other "presentation" components 204–205.

Of course, various changes and modifications to the illustrative embodiment described above will be apparent to those skilled in the art. For example, different presentation component languages may be envisioned for defining the presentation scripts. Or, a different naming convention may be used to reference components. Likewise, conventions other than "records" may be used to define presentation elements, e.g., "bytes", "sentences", and/or "pages". Furthermore, messages may be allowed to have multiple components of the same media type. Such changes and modifications can be made without departing from the spirit and the scope of the invention and without diminishing its attendant advantages. It is therefore intended that such changes and modifications be covered by the following claims.

The invention claimed is:

1. A messaging apparatus comprising:

means for storing a message comprising a header component that describes the message, a plurality of body components each carrying a portion of message information carried by the message, and a plurality of different presentation components separate from the header component and the body components, each defining an order and any concurrency of presentation of the body components to a message recipient; and means responsive to invocation of an individual one of the presentation components, for presenting the body components to the message recipient in the order and with any said concurrency defined by the one presentation component.

2. The messaging apparatus of claim 1 wherein:

the message comprises a plurality of body components at least some of which are expressed in different media, and the one presentation component defines an order of presentation of the body components including a concurrency of presentation of the body components expressed in the different media; and the presenting means are responsive to the invocation of the one presentation component, for presenting the body components in the order defined by the one presentation component including presenting concurrently the body components expressed in the different media.

3. The messaging apparatus of claim 1 wherein:

the one presentation component further defines durations of presentation of the body components; and the presenting means are responsive to the invocation of the one presentation component, for presenting the body components in the order and with any said concurrency for the durations defined by the one presentation component.

4. The messaging apparatus of claim 1 wherein:

at least one of the body components comprises a plurality of records, and the one presentation component defines an order of presentation of the records; and the presenting means are responsive to the invocation of the one presentation component, for presenting the records in the order defined by the one presentation component.

5. The messaging apparatus of claim 1 wherein:

a plurality of the body components are each expressed in a different medium and each comprises a plurality of records, and the one presentation component defines an order of presentation of the records including any concurrency of presentation of records expressed in different media; and the presenting means are responsive to the invocation of the one presentation component, for presenting the records in the order and with any said concurrency defined by the one presentation component.

6. The messaging apparatus of claim 5 wherein:

the one presentation component further defines durations of presentation of the records; and the presenting means are responsive to the invocation of the one presentation component, for presenting the records for the durations defined by the one presentation component.

7. A messaging apparatus comprising:

means for storing a message comprising a header component that describes the message, a plurality of body component each carrying a portion of message information carried by the message and at least some of which are each expressed in a different medium, and a plurality of different presentation components separate from the header component and the body components, each presentation component defining an order and durations of presentation of the body components to a message recipient, including defining concurrency of presentation of at least some of the body components expressed in different media; and means responsive to invocation of an individual presentation component, for presenting the body components to the message recipient in the order and for the durations defined by the individual presentation component, including presenting said some of the body components concurrently to the message recipient.

8. The messaging apparatus of claim 7 wherein:

at least one of the body components comprises a plurality of records, and the individual presentation component defines an order and durations of presentation of the records; and the presenting means are responsive to the invocation of the individual presentation component, for presenting the records to the message recipient in the order and for the durations defined by the individual presentation component.

9. A messaging method comprising the steps of:

receiving in messaging equipment of a message recipient a message that comprises a header component describing the message, a plurality of body components each carrying a portion of message information carried by the message, and a plurality of different presentation components separate from the header component and the body components, each defining an order and any concurrency of presentation of the body components to the message recipient; and in response to the message recipient invoking an individual one of the presentation components in the messaging equipment, the messaging equipment presenting the body components to the message recipient in the order and with any said concurrency defined by the one presentation component.

10. The messaging method of claim 9 further comprising the steps of:

creating the message, including creating the presentation components, under direction of a human message originator; and sending the message from the message originator to the message recipient.

11. The messaging method of claim 9 wherein:

the message comprises a plurality of body components at least some of which are expressed in different media, and the one presentation component defines an order of presentation of the body components including a concurrency of presentation of the body components expressed in the different media; and the step of presenting comprises the step of
presenting the body components in the order defined by the one presentation component, including presenting concurrently the body components expressed in the different media.

12. The messaging method of claim 9 wherein:

the one presentation component further defines durations of presentation of the body components; and the step of presenting comprises the step of
presenting the body components in the order and with any said concurrency for the durations defined by the one presentation component.

13. The messaging method of claim 9 wherein:

at least one of the body components comprises a plurality of records, and the one presentation component defines an order of presentation of the records; and the step of presenting comprises the step of
presenting the records in the order defined by the one presentation component.

14. The messaging method of claim 9 wherein:

a plurality of the body components are each expressed in a different medium and each comprises a plurality of records, and the one presentation component defines an order of presentation of the records including any concurrency of presentation of records expressed in different media; and the step of presenting comprises the step of
presenting the records in the order and with any said concurrency defined by the one presentation component.

15. The messaging method of claim 14 wherein:

the one presentation component further defines durations of presentation of the records; and the step of presenting comprises the step of
presenting the records for the durations defined by the one presentation component.

16. A messaging method comprising the steps of:

receiving in messaging equipment of a message recipient a message that comprises a header component describing the message, a plurality of body components each carrying a portion of message information carried by the message and at least some of which are each expressed in a different medium, and a plurality of different presentation components separate from the header component and the body components, each presentation component defining an order and durations of presentation of the body components to the message recipient, including defining concurrency of presentation of at least some of the body components expressed in different media; and in response to the message recipient invoking an individual presentation component in the messaging equipment, the messaging equipment presenting the body components to the message recipient in the order and for the durations defined by the individual presentation component, including presenting said some of the body components concurrently to the message recipient.

17. The messaging method of claim 16 wherein:

at least one of the body components comprises a plurality of records, and the individual presentation component defines an order and durations of presentation of the records; and the step of presenting comprises the step of
presenting the records to the message recipient in the order and for the durations defined by the individual presentation component.

* * * * *